United States Patent
Fukawatase

(10) Patent No.: US 8,448,981 B2
(45) Date of Patent: May 28, 2013

(54) SIDE AIRBAG DEVICE FOR VEHICLE

(75) Inventor: Osamu Fukawatase, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/384,715

(22) PCT Filed: Aug. 3, 2009

(86) PCT No.: PCT/JP2009/063763
§ 371 (c)(1),
(2), (4) Date: Jan. 18, 2012

(87) PCT Pub. No.: WO2011/016107
PCT Pub. Date: Feb. 10, 2011

(65) Prior Publication Data
US 2012/0126518 A1    May 24, 2012

(51) Int. Cl.
*B60R 21/16*    (2006.01)
(52) U.S. Cl.
USPC .......... 280/730.2; 280/743.1; 280/743.2
(58) Field of Classification Search
USPC ............ 280/730.1, 730.2, 743.1, 743.2
See application file for complete search history.

(56) References Cited

U.S. PATENT DOCUMENTS

| | | | |
|---|---|---|---|
| 5,927,750 A * | 7/1999 | Nakamura et al. | 280/730.2 |
| 6,349,964 B1 * | 2/2002 | Acker et al. | 280/730.2 |
| 7,278,656 B1 * | 10/2007 | Kalandek | 280/730.2 |
| 7,350,811 B2 * | 4/2008 | Sato | 280/743.2 |
| 7,926,838 B2 * | 4/2011 | Honda et al. | 280/729 |
| 7,963,556 B2 * | 6/2011 | Loos et al. | 280/740 |
| 8,033,570 B2 * | 10/2011 | Sato et al. | 280/730.2 |
| 8,056,923 B2 * | 11/2011 | Shimono | 280/730.2 |

(Continued)

FOREIGN PATENT DOCUMENTS

| CN | 1715106 A | 1/2006 |
|---|---|---|
| CN | 1759026 A | 4/2006 |

(Continued)

OTHER PUBLICATIONS

International Search Report issued in International Application No. PCT/JP2009/063763 on Aug. 25, 2009 (with translation).

(Continued)

*Primary Examiner* — Toan To
(74) *Attorney, Agent, or Firm* — Oliff & Berridge, PLC

(57) ABSTRACT

An object is to be able to more appropriately restrain respective portions of an upper body, including a waist portion, of a passenger by a side airbag at a time of a side collision. At a time of a side collision, a side airbag receives a supply of gas and deploys between a passenger and a vehicle body side portion, and an upper bag portion restrains from a head portion to a shoulder portion, and a lower bag portion restrains a waist portion, and an intermediate portion, that connects a lower edge portion of the upper bag portion and an upper edge portion of the lower bag portion, restrains a chest portion. Load, that is imparted toward a vehicle transverse direction inner side from the upper bag portion to the shoulder portion of the passenger at this time, decreases at a latter stage of restraint of the shoulder portion by the upper bag portion, and therefore, an amount of movement of the shoulder portion toward a vehicle transverse direction inner side is suppressed to an appropriate degree.

14 Claims, 14 Drawing Sheets

U.S. PATENT DOCUMENTS

| | | | |
|---|---|---|---|
| 2004/0124615 A1* | 7/2004 | Tanase et al. | 280/730.2 |
| 2005/0023808 A1* | 2/2005 | Sato et al. | 280/730.2 |
| 2005/0189742 A1 | 9/2005 | Kumagai et al. | |
| 2006/0001244 A1 | 1/2006 | Taguchi et al. | |
| 2006/0022441 A1 | 2/2006 | Hayashi et al. | |
| 2007/0164546 A1* | 7/2007 | Kai et al. | 280/730.2 |
| 2010/0171291 A1 | 7/2010 | Schmidt et al. | |

FOREIGN PATENT DOCUMENTS

| | | |
|---|---|---|
| DE | 10 2008 063 794 A1 | 7/2009 |
| EP | 0844948 B1 | 6/1998 |
| JP | A-9-136595 | 5/1997 |
| JP | A-10-273010 | 10/1998 |
| JP | A-11-510765 | 9/1999 |
| JP | A-2004-268682 | 9/2004 |
| JP | A-2006-8017 | 1/2006 |
| JP | A-2009-51471 | 3/2009 |
| WO | WO 2004/065179 A1 | 8/2004 |

OTHER PUBLICATIONS

Feb. 1, 2011 International Preliminary Report on Patentability issued in International Application No. PCT/JP2009/063763 (with translation).

* cited by examiner

SIDE AIRBAG DEVICE FOR VEHICLE

TECHNICAL FIELD

The present invention relates to a side airbag device for a vehicle.

BACKGROUND ART

There is disclosed, in an integral airbag that covers substantially from the head portion to the waist portion of a passenger, a structure in which the integral airbag is divided at least in three in the height direction into an airbag portion that protects substantially the head portion, and airbag portion that protects substantially from the shoulder portion to the chest portion, and an airbag portion that protects substantially from the chest portion to the waist portion, and that causes the airbag portion that protects substantially the head portion and the airbag portion that protects substantially from the chest portion to the waist portion to inflate substantially simultaneously, and next causes the airbag portion that protects substantially from the shoulder portion to the chest portion to inflate (see Patent Document 1).

Further, there is disclosed a structure in which a bag for the chest portion deploys from the side portion of a seat back, at the inner surface side of a door trim or the like that corresponds to the passenger chest portion, and successively, a bag for the head portion deploys at the inner surface side of a window glass that corresponds to the passenger chest portion, and the bag for the chest portion and the seat back are connected to the bag for the head portion in advance via a connecting sheet, and the bag for the head portion after deployment is held so as to be unable to move toward the vehicle outer side (see Patent Document 2).

PRIOR ART DOCUMENTS

Patent Documents

[Patent Document 1] Japanese Patent Application Laid-Open No. 10-273010
[Patent Document 2] Japanese Patent Application Laid-Open No. 9-136595

SUMMARY OF INVENTION

Technical Problem

However, when taking into consideration the behavior of the passenger at the time of a side collision, there is still room for improvement with regard to restraining the passenger by the side airbag.

In view of the above-described circumstances, an object of the present invention is to be able to more appropriately restrain the respective portions of the upper body, including the waist portion, of a passenger by a side airbag at the time of a side collision.

Solution to Problem

A first aspect of the present invention is a side airbag device comprising a side airbag comprising an upper bag portion that is positioned at a vehicle upper side, and corresponds to a head portion to a shoulder portion of a passenger seated in a vehicle seat, a lower bag portion that is positioned at a vehicle lower side of the upper bag portion, and corresponds to a waist portion of the passenger, and an intermediate portion that connects a lower edge portion of the upper bag portion and an upper edge portion of the lower bag portion, and corresponds to a chest portion of the passenger, wherein at a time of a side collision, the side airbag receives a supply of gas for inflation and inflates and deploys between the passenger and a vehicle body side portion, and the side airbag device is configured such that a load, that is imparted toward a vehicle transverse direction inner side from the upper bag portion to the shoulder portion when the shoulder portion is restrained by the upper bag portion, decreases at a latter stage of restraint of the shoulder portion.

In the side airbag device for a vehicle relating to the first aspect, at the time of a side collision, the side airbag receives a supply of gas and deploys between the passenger and a vehicle body side portion, and the upper bag portion restrains from the head portion to the shoulder portion, and the lower bag portion restrains the waist portion, and the intermediate portion, that connects the lower edge portion of the upper bag portion and the upper edge portion of the lower bag portion, restrains the chest portion. The load, that is imparted toward the vehicle transverse direction inner side from the upper bag portion to the shoulder portion of the passenger at this time, decreases at the latter stage of the restraint of the shoulder portion by the upper bag portion, and therefore, the amount of movement of the shoulder portion toward the vehicle transverse direction inner side can be suppressed to an appropriate degree. Therefore, the respective portions of the upper body, including the waist portion, of the passenger can be restrained more appropriately.

In a second aspect of the present invention, in the side airbag device for a vehicle relating to the first aspect, a tubular inflated portion is provided that communicates with a vehicle rear side of the upper bag portion at an end portion at a vehicle upper side, and communicates with a vehicle rear side of the lower bag portion at an end portion at a vehicle lower side, and inflates along a spine direction of the passenger at an initial stage of inflation and deployment of the side airbag.

In the side airbag device for a vehicle relating to the second aspect, at the initial stage of inflation and deployment of the side airbag, the tubular inflated portion inflates along the spine direction of the passenger. Due thereto, the spine of the passenger can be restrained at the initial stage of a side collision, that is earlier than the completion of the inflation and deployment of the side airbag.

Further, because the tubular inflated portion becomes a core region of high pressure at the side airbag at the initial stage of inflation and deployment, the deployment behaviors of the upper bag portion and the lower bag portion thereafter are stable. Therefore, the upper bag portion can be deployed stably at the region corresponding to the head portion to the shoulder portion of the passenger, and the lower bag portion can be deployed stably at the region corresponding to the waist portion of the passenger.

In a third aspect of the present invention, in the side airbag device for a vehicle relating to the second aspect, a tubular inflator at which gas ejection holes are disposed at a vehicle upper side, is provided within the tubular inflated portion, and a diffuser, which directs a flow of gas that is ejected from the gas ejection holes toward the upper bag portion side and the lower bag portion side, is provided at the inflator.

In the side airbag device for a vehicle relating to the third aspect, the flow of gas that is ejected from the gas ejection holes of the inflator, can be directed to the upper bag portion side and the lower bag portion side by the diffuser that is provided at the inflator. Therefore, the upper bag portion and the lower bag portion can respectively be inflated and deployed appropriately by using a general-purpose inflator that has gas ejection holes at one end thereof.

In a fourth aspect of the present invention, in the side airbag device for a vehicle relating to the second aspect or the third aspect, an inflated thickness of the upper bag portion when the side airbag inflates and deploys is set to be thicker than an inflated thickness of the lower bag portion, an internal pressure of the lower bag portion is set to be higher than an internal pressure of the upper bag portion, and the lower bag portion is configured such that inflation and deployment thereof are completed before that of the upper bag portion.

In the side airbag device for a vehicle relating to the fourth aspect, because the inflated thickness of the upper bag portion when the side airbag inflates and deploys is set to be thicker than the inflated thickness of the lower bag portion, the head portion, that is positioned further toward the vehicle transverse direction inner side than the shoulder portion and the waist portion, can be restrained more appropriately by the upper bag portion.

Further, because the internal pressure of the lower bag portion is set to be higher than the internal pressure of the upper bag portion, the waist portion of the passenger can be restrained appropriately by the lower bag portion, even if the inflated thickness of the lower bag portion is thinner than the upper bag portion.

Moreover, because inflation and deployment of the lower bag portion are completed before the upper bag portion, the waist portion is restrained at an earlier stage than the shoulder portion and the head portion. Due to the waist portion, at which the strength is relatively great among the upper body of the passenger, being restrained at an early stage than the lower bag portion and being moved toward the vehicle transverse direction inner side, the respective portions of the upper body of the passenger, including the waist portion, can be restrained even more appropriately.

In a fifth aspect of the present invention, in the side airbag device for a vehicle relating to the fourth aspect, a lower check valve, which permits passage of gas toward the lower bag portion side and restricts passage of gas in a direction opposite thereto, is provided at the end portion at the vehicle lower side of the tubular inflated portion.

In the side airbag device for a vehicle relating to the fifth aspect, at the time of a side collision, the lower bag portion inflates and deploys due to gas that is supplied from the tubular inflated portion through the lower check valve to the lower bag portion. When the supply of gas ends and gas attempts to flow backward from the lower bag portion to the tubular inflated portion side, the lower check valve restricts this flow of gas, and therefore, the internal pressure of the lower bag portion can be maintained over a longer time. Therefore, the waist portion of the passenger can be restrained appropriately by the lower bag portion.

In a sixth aspect of the present invention, in the side airbag device for a vehicle relating to the fifth aspect, an upper check valve, which permits passage of gas toward the upper bag portion side and restricts passage of gas in a direction opposite thereto, is provided at the end portion at the vehicle upper side of the tubular inflated portion.

In the side airbag device for a vehicle relating to the sixth aspect, at the time of a side collision, the upper bag portion inflates and deploys due to gas that is supplied from the tubular inflated portion through the upper check valve to the upper bag portion. When the supply of gas ends and gas attempts to flow backward from the upper bag portion to the tubular inflated portion side, the upper check valve restricts this flow of gas, and therefore, the internal pressure of the upper bag portion can be maintained over a longer time. Therefore, from the head portion to the shoulder portion of the passenger can be restrained appropriately by the upper bag portion.

In a seventh aspect of the present invention, in the side airbag device for a vehicle relating to the sixth aspect, flow path opening surface areas and flow path lengths of the lower check valve and the upper check valve are configured such that gas that is supplied into the tubular inflated portion is distributed in accordance with respective volumes and internal pressure settings of the upper bag portion and the lower bag portion.

In the side airbag device for a vehicle relating to the seventh aspect, by setting the flow path opening surface areas and the flow path lengths at the lower check valve and the upper check valve, the gas that is supplied into the tubular inflated portion can be distributed in accordance with the respective volumes and internal pressure settings of the upper bag portion and the lower bag portion. Therefore, the upper bag portion and the lower bag portion can respectively be inflated and deployed at desired timings, and, after the gas is supplied, the upper bag portion and the lower bag portion can respectively be maintained at the desired internal pressures.

In an eighth aspect of the present invention, in the side airbag device for a vehicle relating to any one aspect of the first through seventh aspects, an extended bag portion, that extends to a region corresponding to a front portion of the chest portion of the passenger, is provided at a vehicle front side lower end edge of the upper bag portion.

In the side airbag device for a vehicle relating to the eighth aspect, at the time of a side collision, the front portion, at which the strength is relatively great among the chest portion of the passenger, can be restrained by the extended bag portion that is provided at a vehicle front side lower end edge of the upper bag portion. Therefore, the load, that is inputted to the passenger when the passenger is restrained by the side airbag, can be dispersed.

Advantageous Effects of Invention

As described above, in accordance with the side airbag device for a vehicle relating to the first aspect of the present invention, there is the excellent effect that, at the time of a side collision, the respective portions of the upper body, including the waist portion, of a passenger can be restrained more appropriately by the side airbag.

In accordance with the side airbag device for a vehicle relating to the second aspect, there is the excellent effect that the spine of the passenger can be restrained at the initial stage of a side collision, that is earlier than the completion of the inflation and deployment of the side airbag.

In accordance with the side airbag device for a vehicle relating to the third aspect, there is the excellent effect that the upper bag portion and the lower bag portion can respectively be inflated and deployed appropriately by using a general-purpose inflator that has gas ejection holes at one end thereof.

In accordance with the side airbag device for a vehicle relating to the fourth aspect, there is the excellent effect that the respective portions of the upper body of a passenger, including the waist portion, can be restrained even more appropriately by the side airbag.

In accordance with the side airbag device for a vehicle relating to the fifth aspect, there is the excellent effect that the waist portion of a passenger can be restrained appropriately by the lower bag portion.

In accordance with the side airbag device for a vehicle relating to the sixth aspect, there is the excellent effect that from the head portion to the shoulder portion of a passenger can be restrained appropriately by the upper bag portion.

In accordance with the side airbag device for a vehicle relating to the seventh aspect, there are the excellent effects that the upper bag portion and the lower bag portion can respectively be inflated and deployed at desired timings, and, after the gas is supplied, the upper bag portion and the lower bag portion can respectively be maintained at the desired internal pressures.

In accordance with the side airbag device for a vehicle relating to the eighth aspect, there is the excellent effect that the load, that is inputted to a passenger when the passenger is restrained by the side airbag, can be dispersed.

BRIEF DESCRIPTION OF DRAWINGS

FIG. 5 is a perspective view showing the side airbag that is inflated and deployed.

FIG. 6 is an enlarged perspective view showing a state in which a lower check valve is closed.

FIG. 7 is an enlarged perspective view showing a state in which an upper check valve is closed.

FIG. 8 is a perspective view showing the side airbag that is inflated and deployed.

FIG. 9 is a plan view showing a state in which a shoulder portion of the passenger has entered-into and is restrained by a valley portion of an upper bag portion.

FIG. 12 is a side view showing a state in which the side airbag is inflated and deployed at the side of the passenger.

FIG. 13 is an enlarged perspective view showing a diffuser and an inflator.

FIG. 14 is an enlarged perspective view showing a modified example of the diffuser, and the inflator.

DESCRIPTION OF EMBODIMENTS

Figure 1:
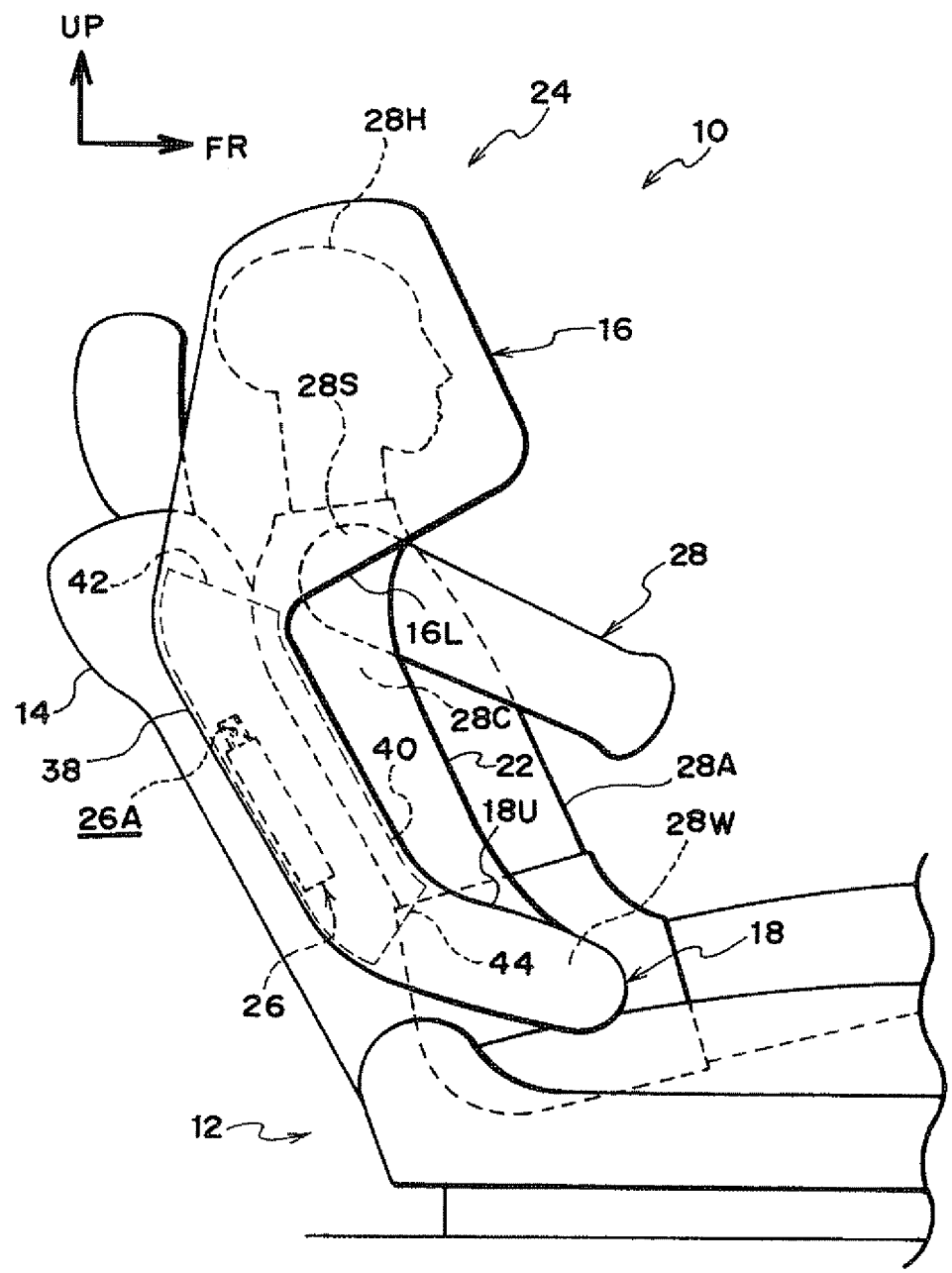
FIG. 1 is a side view showing a state in which a side airbag is inflated and deployed at the side of a passenger, as seen from a vehicle outer side, in a side airbag device for a vehicle.

Embodiments of the present invention are described hereinafter on the basis of the drawings. In FIG. 1 through FIG. 4, a side airbag device 10 for a vehicle relating to the present embodiments relates to, for example, a side airbag device that is installed in the side portion of a seat back 14 at a vehicle seat 12, and has a side airbag 24 having an upper bag portion 16, a lower bag portion 18 and an intermediate portion 22.

Figure 3:
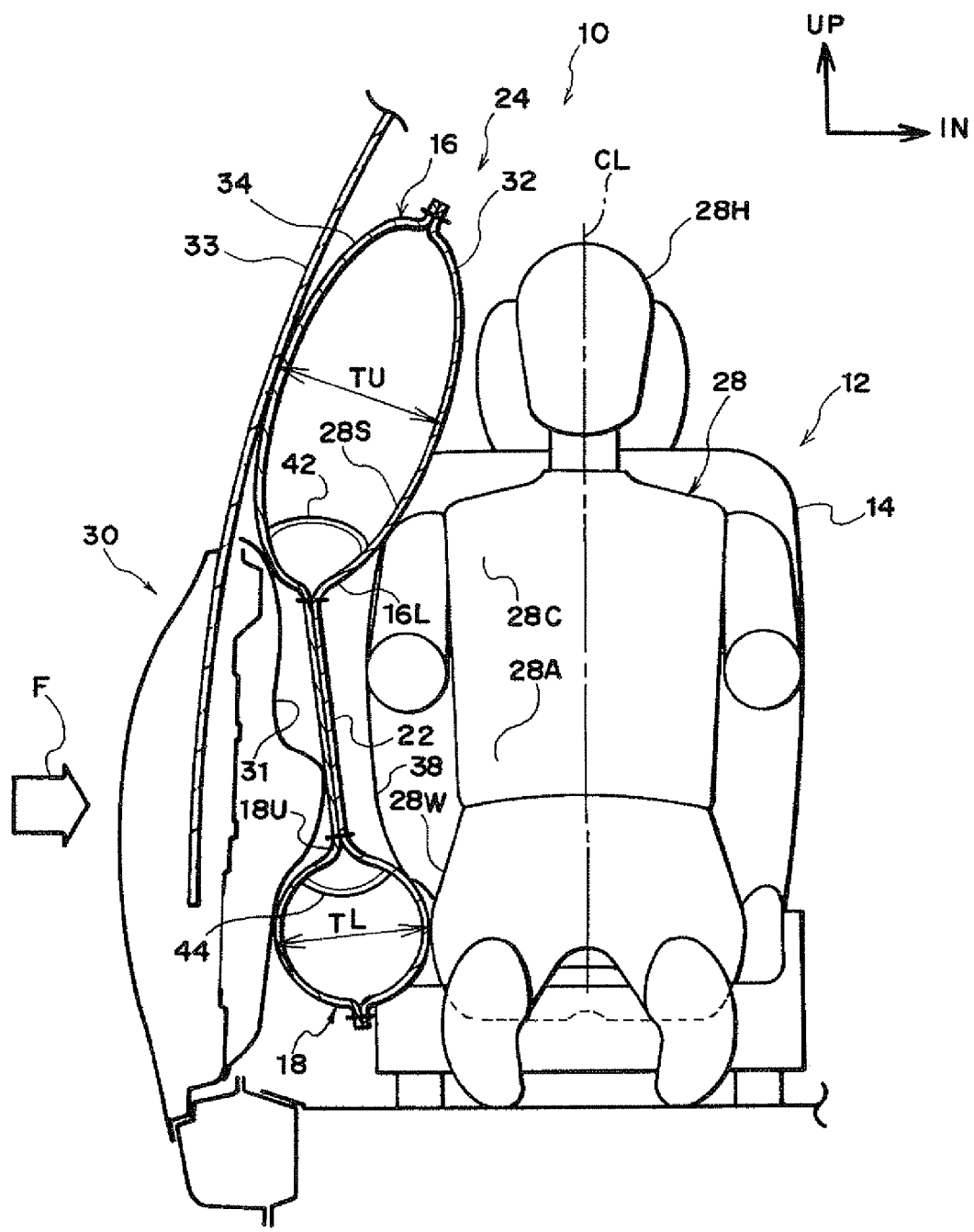
FIG. 3 is a sectional view showing, in a partial cross-section, the state at the first stage of restraint in which the side airbag is inflated and deployed between the passenger and a side door and restraint of the passenger by the side airbag has started, as seen from a vehicle front side.

As shown in FIG. 3, the side airbag 24 is configured so as to, at the time of a side collision, receive a supply of gas for inflation from an inflator 26 for example, and inflate and deploy between a passenger 28 and a side door 30 that is an example of a vehicle body side portion. At the side airbag 24, the upper bag portion 16, the lower bag portion 18, the intermediate portion 22, and a tubular inflated portion 38 that is described later are configured integrally due to, for example, a passenger side base cloth 32 and a door side base cloth 34 being sewn. The passenger side base cloth 32 and the door side base cloth 34 are configured by using, for example, non-extendable materials. Note that the side airbag 24 is not limited to being manufactured by sewing, and may be made by bag-weaving.

Figure 2:
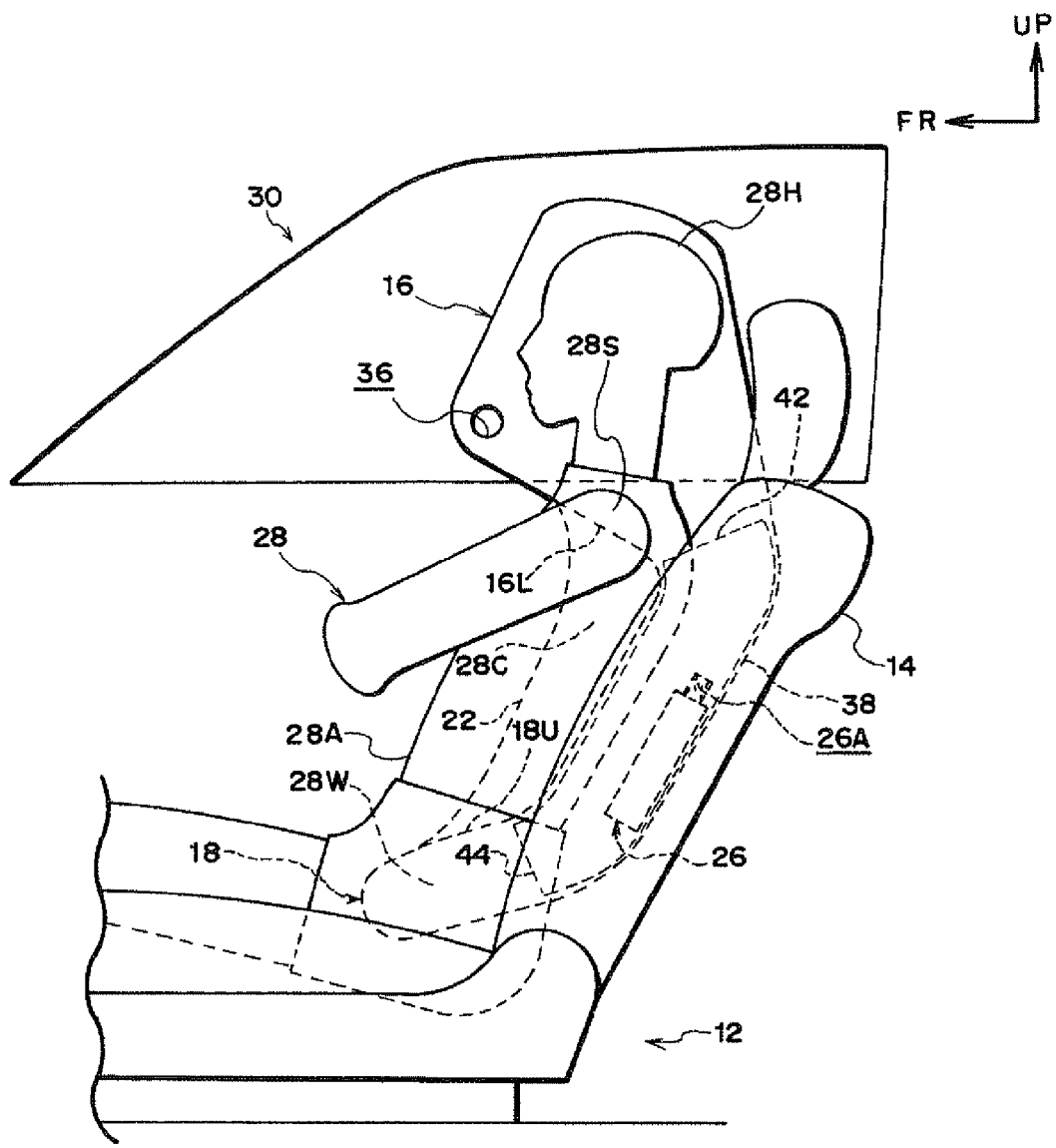
FIG. 2 is a side view showing the state in which the side airbag is inflated and deployed at the side of the passenger, as seen from a vehicle inner side.

From FIG. 1 to FIG. 4, the upper bag portion 16 is positioned at the vehicle upper side, and corresponds to a head portion 28H to a shoulder portion 28S of the passenger 28 seated in the vehicle seat 12, and is an inflating portion that inflates toward the vehicle transverse direction outer side (the side door 30 side) of a region from the head portion 28H to the shoulder portion 28. As shown in FIG. 2, a vent hole 36 for example is provided in the upper bag portion 16. In the present embodiment, when the shoulder portion 28S is restrained by the upper bag portion 16, due to the upper bag portion 16 being pushed from vehicle transverse direction both sides by the passenger 28 and the side door 30, gas within the upper bag portion 16 is discharged-out through the vent hole 36. Due thereto, it is configured such that the load, that is inputted from the upper bag portion 16 to the shoulder portion 28S toward the vehicle transverse direction inner side, decreases at the latter stage of the restraint of the shoulder portion 28S.

To describe further, it is desirable to provide the vent hole 36 at a position that does not overlap the passenger 28 or the side door 30 in the vehicle transverse direction (at a position that is further upward than a door trim 31), in order for the vent hole 36 to not be blocked at the time of restraint of the passenger 28. In order to make the load, that is inputted from the upper bag portion 16 to the shoulder portion 28S toward the vehicle transverse direction inner side, decrease at the latter stage of restraint of the shoulder portion 28S, it is desirable that the vent hole 36 be formed at a position, of the upper bag portion 16, at which the time of the arrival of gas from the inflator 26 is late. In consideration of these points, the vent hole 36 is formed, for example, at one place at the lower end portion of the vehicle front side, of the vehicle transverse direction inner side portion of the upper bag portion 16.

Note that the position, shape and number of the vent hole 36 are not limited to the illustrated example. Further, as a structure that is equivalent to the vent hole 36, a non-sewn portion (not illustrated) may be provided at a portion of the sewn portion of the passenger side base cloth 32 and the door side base cloth 34 at the upper bag portion 16, or a planned opening portion (not illustrated), that opens when the internal pressure of the upper bag portion 16 becomes greater than or equal to a predetermined value, may be provided.

From FIG. 1 to FIG. 4, the lower bag portion 18 is positioned at the vehicle lower side of the upper bag portion 16, and corresponds to a waist portion 28W of the passenger 28, and is an inflated portion that inflates at the vehicle transverse direction outer side (the side door 30 side) of the waist portion 28W. As shown in FIG. 1, the inflated shape of the lower bag portion 18 in a vehicle side view is set so as to be able to restrain at least the central position (not illustrated) of the pelvis. This is because the volume of the side airbag 24 is reduced, an inflator that is compact and has a small output can be used as the inflator 26, and the increase in cost can be suppressed.

As shown in FIG. 3, in the vehicle transverse direction, an inflated thickness TU of the upper bag portion 16 when the side airbag 24 is inflated and deployed is set to be thicker than an inflated thickness TL of the lower bag portion 18. Further, the internal pressure of the lower bag portion 18 when the side airbag 24 is inflated and deployed is set to be higher than the internal pressure of the upper bag portion 16. Moreover, the lower bag portion 18 is set to have, for example, a smaller volume than the upper bag portion 16 such that inflation and deployment thereof is completed before that of the upper bag portion 16 when the side airbag 24 inflates and deploys.

From FIG. 1 to FIG. 4, the intermediate portion 22 connects a lower edge portion 16L of the upper bag portion 16 and an upper edge portion 18U of the lower bag portion 18, and is a region corresponding to a chest portion 28C of the passenger 28, and is configured as a film-shaped non-inflating portion by, for example, the passenger side base cloth 32 and the door side base cloth 34 being superposed. As shown in FIG. 1, this intermediate portion 22 is set so as to, for example, deploy at the region from the central portion of the chest portion 28C to the back side of the passenger 28, as seen in a vehicle side view. Note that this intermediate portion 22 is not limited to a non-inflating portion, and may be a thin inflated portion whose inflated thickness in the vehicle transverse direction is smaller than the upper bag portion 16 and the lower bag portion 18.

As shown in FIG. 1, the tubular inflated portion 38, that communicates with the vehicle rear side of the upper bag portion 16 at an end portion 42 at the vehicle upper side, and communicates with the vehicle rear side of the lower bag portion 18 at an end portion 44 at the vehicle lower side, and inflates along the spine direction of the passenger 28 at the initial stage of inflation and deployment of the side airbag 24, is provided at the side airbag 24.

Concretely, when the side airbag 24 inflates and deploys, the end portion 42 at the vehicle upper side of the tubular inflated portion 38 is positioned, for example, at a height in a vicinity of the shoulder portion 28S of the passenger 28, and the end portion 44 at the vehicle lower side is positioned, for example, at a height in a vicinity of an abdomen portion 28A of the passenger 28. Further, a reinforcing cloth 40, that is tubular for example, is sewn to the inner surface of the tubular inflated portion 38. Moreover, the upper end of this reinforcing cloth 40 is the end portion 42 at the vehicle upper side of the tubular inflated portion 38 that communicates with the vehicle rear side of the upper bag portion 16, and the lower end of the reinforcing cloth 40 is the end portion 44 at the vehicle lower side of the tubular reinforcing portion 38 that communicates with the vehicle rear side of the lower bag portion 18.

The tubular inflator 26, at which gas ejection holes 26A are disposed at the vehicle upper side, is provided within the tubular inflated portion 38. Accordingly, gas that is ejected from the gas ejection holes 26A when the inflator 26 operates, is first supplied into the tubular inflated portion 38. Due thereto, the deployment behaviors of the upper bag portion 16 and the lower bag portion 18 thereafter are stable. Further, due to the tubular inflated portion 38 inflating and the internal pressure thereof increasing earlier, a core region of high pressure at the side airbag 24 is formed. Due to this tubular inflated portion 38, it is also possible to restrain the spine, for example, of the passenger 28 at the initial stage of the side collision that is earlier than the completion of the inflation and deployment of the side airbag 24.

Although not illustrated, the inflator 26 is fixed to an unillustrated seat back frame, and is connected to an airbag ECU via a wire harness, and is configured so as to operate by operation current from the airbag ECU and supply gas for inflation to the side airbag 24. The airbag ECU is configured so as to cause operation current to flow to the inflator 26 when the airbag ECU judges a side collision due to a signal from a collision sensor (not illustrated).

(Operation)

The present embodiment is configured as described above, and operation thereof is described hereinafter. From FIG. 1 to FIG. 4, at the side airbag device 10 for a vehicle relating to the present embodiment, when side collision load F (FIG. 3, FIG. 4) is inputted to the side door 30 that is a vehicle body side portion, when the airbag ECU judges the occurrence of the side collision on the basis of a signal from an unillustrated collision sensor, operation current is made to flow from the airbag ECU to the inflator 26. The inflator 26 receives the operation current and operates, and a causes a large amount of gas to be ejected from the gas ejection holes 26A. Due to this gas being supplied into the side airbag 24, the side airbag 24 swells-out from the seat back 14, and inflates and deploys between the passenger 28 and the side door 30. Of this side airbag 24, the upper bag portion 16 enters into the gap between, for example, a glass 33 of the side door 30 and the passenger 28, and inflates and deploys, and the lower bag portion 18 enters into the gap between, for example, the door trim 31 of the side door 30 and the passenger 28, and inflates and deploys. Then, from the head portion 28H to the shoulder portion 28S is restrained by the upper bag portion 16, and the waist portion 28W is restrained by the lower bag portion 18, and further, the chest portion 28C and the abdomen portion 28A can be restrained by the intermediate portion 22 that connects the lower edge portion of the upper bag portion 16 and the upper edge portion of the lower bag portion 18.

Concretely, because the inflator 26 is provided within the tubular inflated portion 38 that is reinforced by the reinforcing cloth 40, the gas that is ejected from the gas ejection holes 26A is first supplied into the tubular inflated portion 38. Due thereto, at the initial stage of inflation and deployment of the side airbag 24, the tubular inflated portion 38 inflates along the spine direction of the passenger 28. Due to this tubular inflated portion 38, the spine of the passenger 28 can be restrained at the initial stage of the side collision that is earlier than the completion of the inflation and deployment of the side airbag 24.

Further, because the tubular inflated portion 38 becomes a core region of high pressure at the side airbag 24 at the initial stage of inflation and deployment, the deployment behaviors of the upper bag portion 16 and the lower bag portion 18 thereafter are stable. Due thereto, the upper bag portion 16 receives a supply of gas from the end portion 42 at the vehicle upper side of the tubular inflated portion 38, and the upper bag portion 16 deploys stably at the region corresponding to the head portion 28H to the shoulder portion 28S of the passenger 28. Further, the lower bag portion 18 receives a supply of gas from the end portion 44 at the vehicle lower side of the tubular inflated portion 38, and deploys stably at the region corresponding to the waist portion 28W of the passenger 28.

Here, as shown in FIG. 3, the inflated thickness TU of the upper bag portion 16 when the side airbag 24 is inflated and deployed is set to be thicker than the inflated thickness TL of the lower bag portion 18. Therefore, the head portion 28H, that is positioned further toward the vehicle transverse direction inner side than the shoulder portion 28S and the waist portion 28W, can be restrained appropriately by the upper bag portion 16.

Further, due to the shoulder portion 28S being pushed toward the vehicle transverse direction inner side at the initial stage of restraint of the passenger 28 by the upper bag portion 16, the load to the chest portion 28C can be reduced. When the restraint of the shoulder portion 28S by the upper bag portion 16 advances, the upper bag portion 16 is pressed from vehicle transverse direction both sides by the passenger 28 and the side door 30, and therefore, gas within the upper bag portion 16 is discharged-out through the vent hole 36 (FIG. 2). Due thereto, the load, that is imparted toward the vehicle transverse direction inner side from the upper bag portion 16 to the shoulder portion 28S of the passenger 28, decreases at the latter stage of restraint of the shoulder portion 28S by the upper bag portion 16, and therefore, the amount of movement of the shoulder portion 28S toward the vehicle transverse direction inner side can be suppressed to an appropriate degree. Because the vent hole 36 is provided, for example, at one place at the lower end portion of the vehicle front side of the vehicle transverse direction inner side portion of the upper bag portion 16, the flowing-out of gas in the inflating and deploying process of the upper bag portion 16 is suppressed. Due thereto, the initial internal pressure of the upper bag portion 16 can be increased sufficiently.

Next, because the internal pressure of the lower bag portion 18 is set to be higher than the internal pressure of the upper bag portion 16, even if the inflated thickness of the lower bag portion 18 is thinner than the upper bag portion 16, the waist portion 28W of the passenger 28 can be restrained appropriately by the lower bag portion 18.

The volume of the lower bag portion 18 is set to an extent such that at least the central position (not illustrated) of the pelvis in a vehicle side view can be restrained, and inflation and deployment are completed before the upper bag portion 16. Therefore, the waist portion 28W of the passenger 28 is restrained at an earlier stage than the shoulder portion 28S and the head portion 28H. Due to the waist portion 28W, at which the strength is relatively great among the upper body of the passenger 28, being restrained at an early stage than the lower bag portion 18 and being moved toward the vehicle transverse direction inner side, the respective portions of the upper body of the passenger 28, including the waist portion 28W, can be restrained even more appropriately by the side airbag 24.

Figure 4:
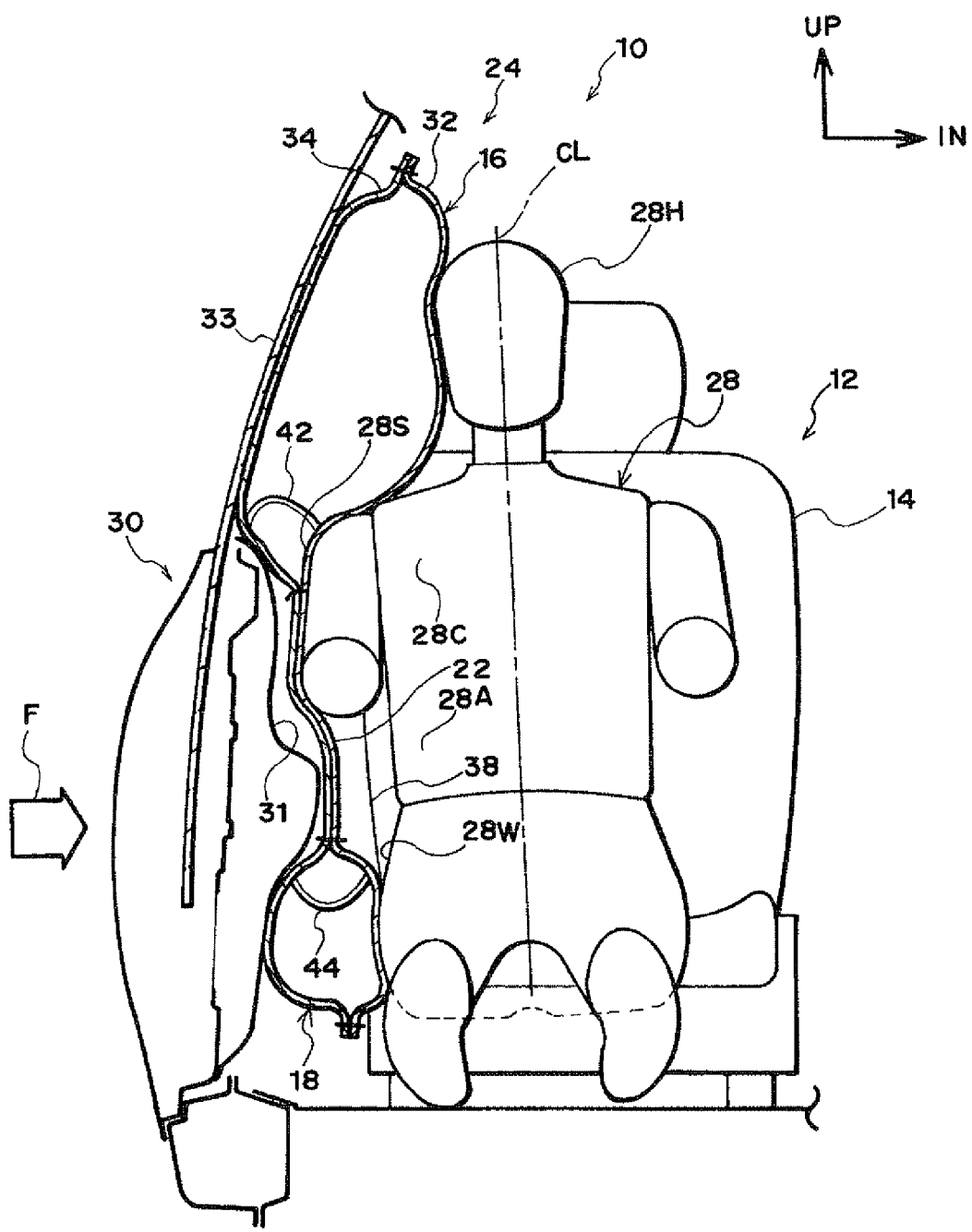
FIG. 4 is a sectional view showing, in a partial cross-section, the state at the latter stage of restraint in which restraint of the passenger by the side airbag has advanced further from the state of FIG. 3.

Concretely, as shown in FIG. 4, when restraint of the upper body by the side airbag 24 is completed, a central line CL of the upper body as seen from the front of the passenger 28 is maintained substantially rectilinearly even while tilting with respect to the vehicle vertical direction, and therefore, the posture of the passenger 28 does not vary greatly.

Further, the intermediate portion 22 is a non-inflating portion that is film-shaped and whose thickness is thinner than the upper bag portion 16 and the lower bag portion 18. Therefore, the load that is inputted from the intermediate portion 22 to the chest portion 28C can be decreased due to the chest portion 28C of the passenger 28 being restrained by the intermediate portion 22 after the shoulder portion 28S is pushed by the upper bag portion 16 earlier.

In this way, in accordance with the side airbag device 10 for a vehicle relating to the present embodiment, the posture of the passenger 28 at the time of a side collision can be controlled appropriately by the side airbag 24 that is integral.

MODIFIED EXAMPLE 1

Figure 5:
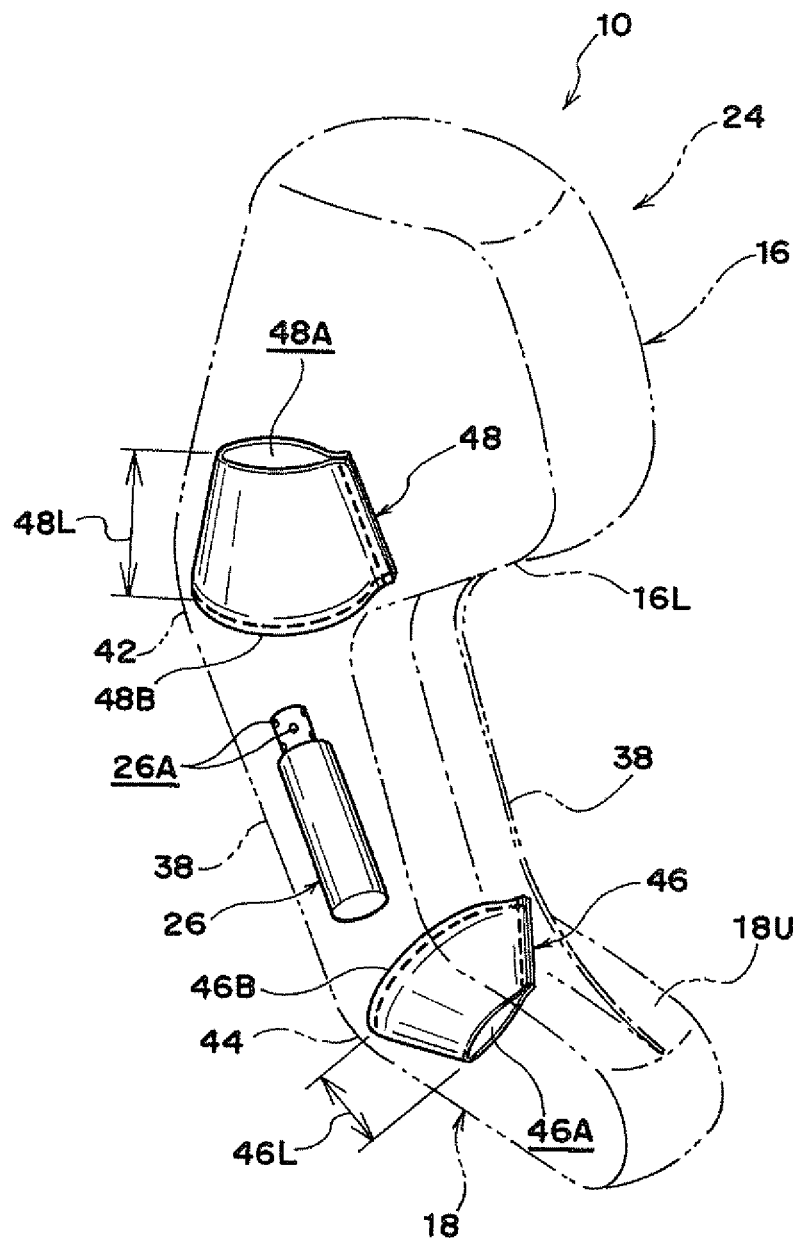
FIG. 5 through FIG. 7 relate to modified example 1.

The tubular inflated portion 38 can also be made to be the structure of modified example 1 shown in FIG. 5. In this modified example 1, a lower check valve 46, which permits passage of gas to the lower bag portion 18 side and restricts passage of gas in the direction opposite thereto, is provided at the end portion 44 at the vehicle lower side of the tubular inflated portion 38, and an upper check valve 48, which permits passage of gas to the upper bag portion 16 side and restricts passage of gas in the direction opposite thereto, is provided at the end portion 42 at the vehicle upper side of the tubular inflated portion 38.

The lower check valve 46 and the upper check valve 48 are configured by, for example, base cloths that are flexible being sewn in the shapes of funnels that taper respectively toward opening portion 46A, 48A sides, and are sewn to the inner peripheral surface of the tubular inflated portion 38 at base end portions 46B, 48B for example. The flow path opening surface areas and flow path lengths of this lower check valve 46 and upper check valve 48 are configured such that the gas that is supplied from the inflator 26 into the tubular inflated portion 38 is distributed in accordance with the respective volumes and internal pressure settings of the upper bag portion 16 and the lower bag portion 18.

Concretely, at the lower check valve 46, the flow path opening surface area of the opening portion 46A is set to be relatively small in accordance with the volume of the lower bag portion 18. Due thereto, flowing-in of gas from the tubular inflated portion 38 into the lower bag portion 18 that has a relatively small volume is suppressed, the inflation timing of the lower bag portion 18 is delayed, and flowing-in of gas into the upper bag portion 16 can be promoted.

Figure 6:
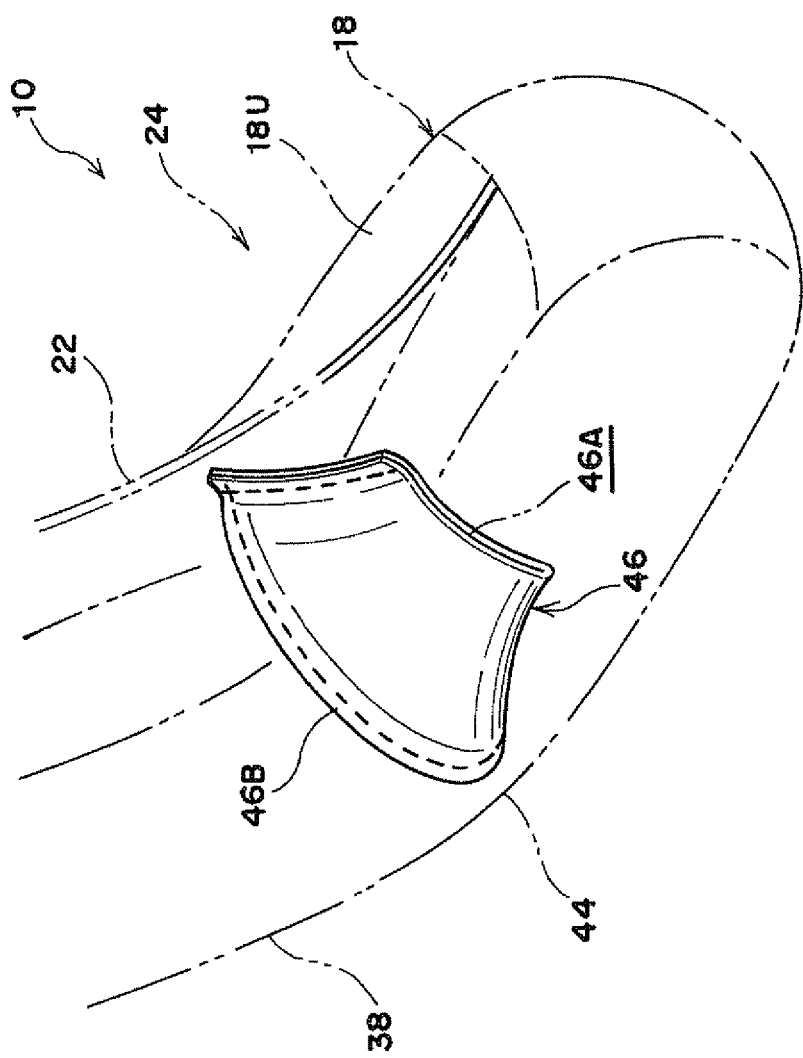

Further, a flow path length 46L of the lower check valve 46 is set to be relatively small in consideration of the timing of restraining the waist portion 28W of the passenger 28 by the lower bag portion 18. When the flow path length 46L is small, it is difficult for the base cloth of the lower check valve 46 to bend. Accordingly, when the supply of gas to the lower bag portion 18 ends and gas attempts to flow backward from the lower bag portion 18 to the tubular inflated portion 38 side, and concretely. When the internal pressure of the lower bag portion 18 becomes higher than the internal pressure of the tubular inflated portion 38 due to the restraint of the waist portion 28W of the passenger 28, the opening portion 46A of the lower check valve 46 closes relatively slowly as shown in FIG. 6.

The internal pressure of the lower bag portion 18 can be maintained over a longer time while the supplying of gas to the upper bag portion 16 is promoted, by restricting the backward flow of gas while delaying the closing timing of the lower check valve 46 in this way. Further, the waist portion 28W (see FIG. 1, FIG. 4) of the passenger 28 can be restrained appropriately by this lower bag portion 18.

On the other hand, at the upper check valve 48, the flow path opening surface area of the opening portion 48A is set to be relatively large in accordance with the volume of the upper bag portion 16. Due thereto, flowing-in of gas from the tubular inflated portion 38 to the upper bag portion 16 that has a relatively large volume is promoted, and the inflation timing of the upper bag portion 16 can be advanced, and flowing-in of gas to the lower bag portion 18 that has a relatively small volume can be suppressed.

Figure 7:
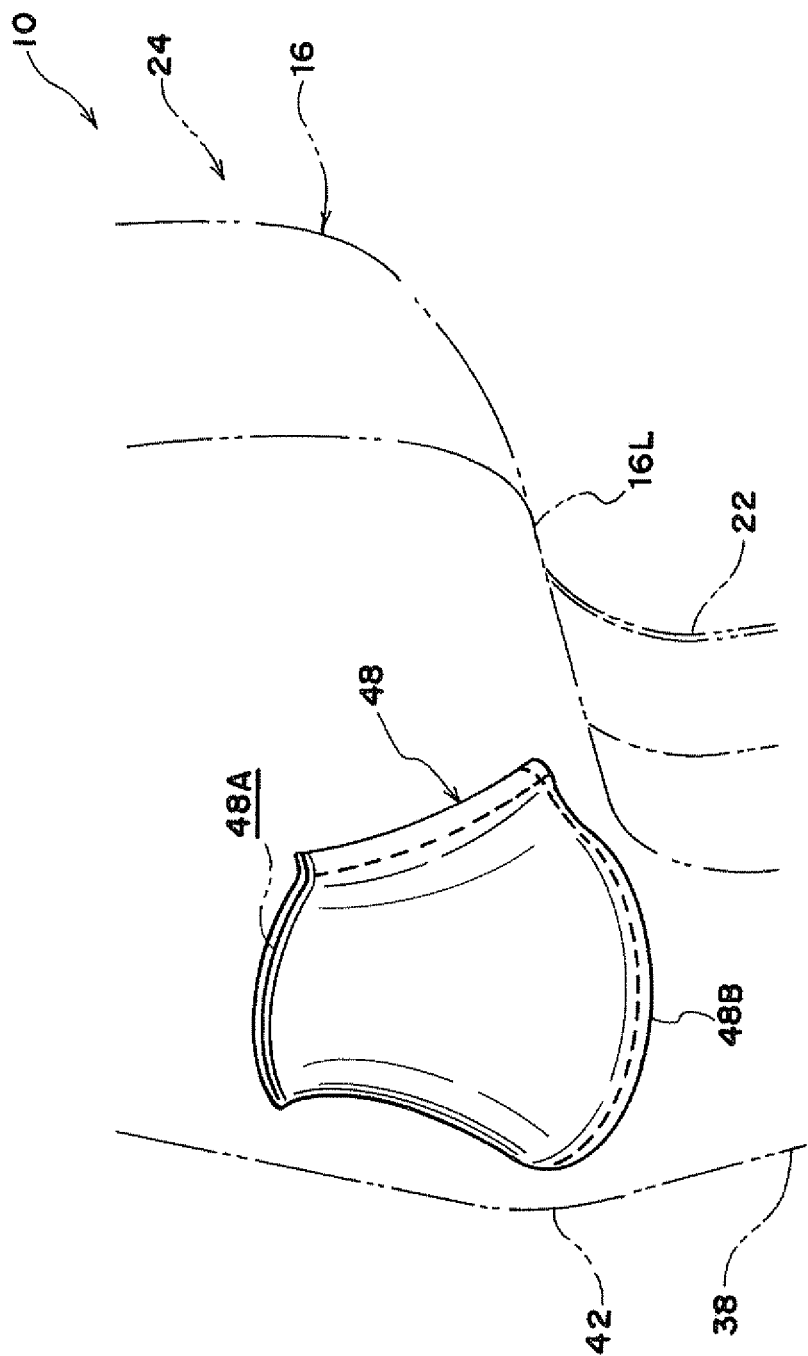

Further, a flow path length 48L of the upper check valve 48 is set to be relatively large in consideration of the timing of restraint of the shoulder portion 28S and the head portion 28H of the passenger 28 by the upper bag portion 16. When the flow path length 48L is large, it is easy for the base cloth of the upper check valve 48 to bend. Accordingly, when the supply of gas to the upper bag portion 16 ends and gas attempts to flow backward from the upper bag portion 16 to the tubular inflated portion 38 side, and concretely, when the internal pressure of the upper bag portion 16 becomes higher than the internal pressure of the tubular inflated portion 38 due to the restraint of the shoulder portion 28S and the head portion 28H of the passenger 28, the opening portion 48A of the upper check valve 48 closes relatively quickly as shown in FIG. 7.

The internal pressure of the upper bag portion 16 can be maintained over a longer time, by restricting the backward flow of gas while advancing the closing timing of the upper check valve 48 in this way. Further, the shoulder portion 28S and the head portion 28H (see FIG. 1, FIG. 4) of the passenger 28 can be restrained appropriately by this upper bag portion 16.

As described above, in accordance with the side airbag device 10 for a vehicle relating to modified example 1, by setting the flow path opening surface areas of the opening portions 46A, 48A and the flow path lengths 46L, 48L at the lower check valve 46 and the upper check valve 48, the gas that is supplied into the tubular inflated portion 38 can be distributed in accordance with the respective volumes and internal pressure settings of the upper bag portion 16 and the lower bag portion 18. Therefore, the upper bag portion 16 and the lower bag portion 18 can respectively be inflated and deployed at desired timings, and, after the gas is supplied, the upper bag portion 16 and the lower bag portion 18 can respectively be maintained at the desired internal pressures.

MODIFIED EXAMPLE 2

Figure 8:
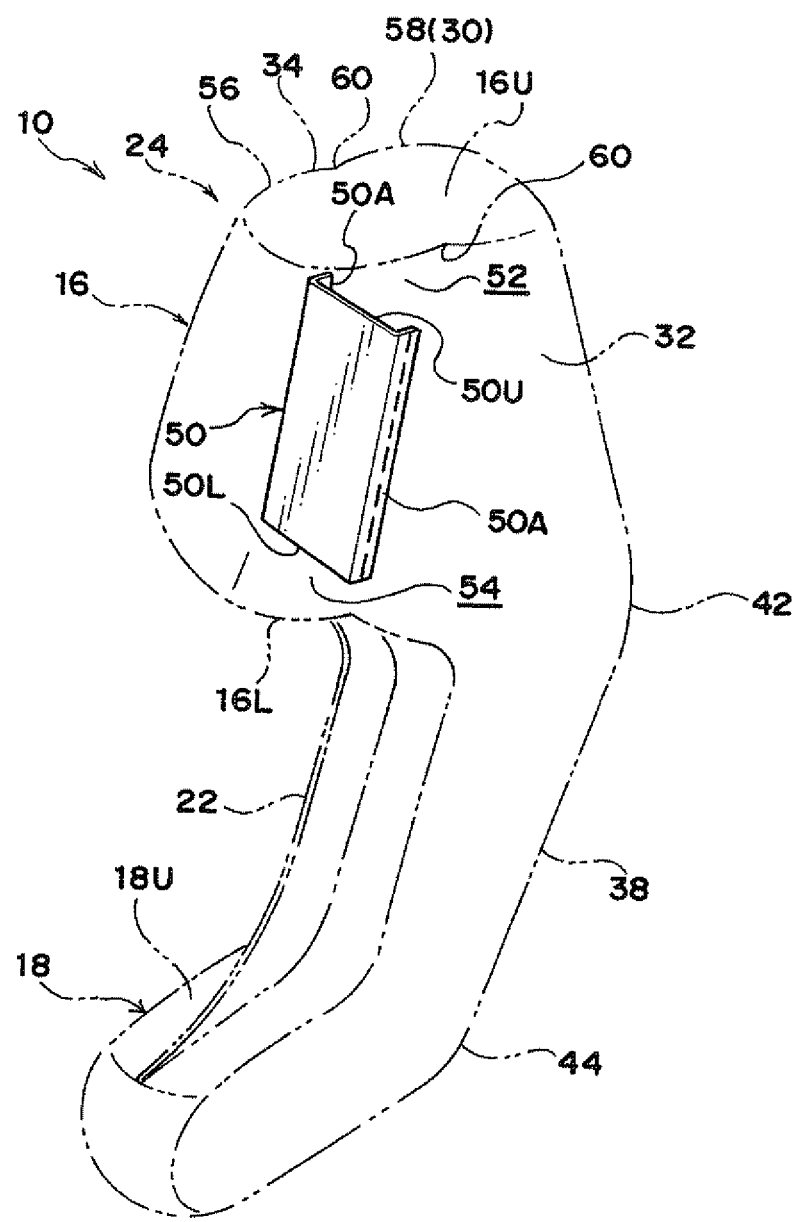
FIG. 8 and FIG. 9 relate to modified example 2.

FIG. 8, the tubular inflated portion 38 can also be made to be the structure of modified example 2 shown in FIG. 8. In this modified example 2, a tether 50, that restricts the inflated thickness of the upper bag portion 16, is provided within the upper bag portion 16. This tether 50 is sewn respectively to the passenger side base cloth 32 and the door side base cloth 34 at end edges 50A at the vehicle transverse both sides, and extends, for example, along the longitudinal direction of the tubular inflated portion 38. Although the front-rear position of the tether 50 is arbitrary, it is preferably a front-rear position that corresponds to the shoulder portion 28S or the head portion 28H of the passenger 28 as shown in FIG. 9.

As shown in FIG. 8, a predetermined gap 52 is provided between an upper end 50U of the tether 50 and an upper edge portion 16U of the upper bag portion 16, and a predetermined gap 54 is provided also between a lower end 50L of the tether 50 and the lower edge portion 16L of the upper bag portion 16. The upper bag portion 16 interior is divided by this tether 50 into a region 56 at the vehicle front side and a region 58 at the vehicle rear side, and the region 58 at the vehicle rear side also serves as the upper portion of the tubular inflated portion 38. Accordingly, when the side airbag 24 inflates and deploys, the tubular inflated portion 38 inflates to an even higher position, along the spine direction of the passenger 28 (see FIG. 1).

Of the upper bag portion 16, the region 56 at the vehicle front side of the tether 50 inflates and deploys due to gas, that is within the region 58 at the vehicle rear side, flowing-in through the gaps 52, 54 that are above and below the tether 50. By doing so, the inflated thickness of the upper bag portion 16 that is inflated and deployed is restricted by the tether 50. Concretely, at the positions of the end edges 50A of the tether 50 that are sewn to the passenger side base cloth 32 and the door side base cloth 34, by making the inflated thickness of the upper bag portion 16 partially small, valley portions 60, that run along the longitudinal directions of the end edges 50A of the tether 50, are formed at the vehicle transverse direction both sides of the upper bag portion 16. Accordingly, as shown in FIG. 9, when the tether 50 is provided at a front-rear position that corresponds to the shoulder portion 28S or the head portion 28H of the passenger 28, the passenger 28 can be restrained more stably due to the shoulder portion 28S or the head portion 28H entering-into the valley portion 60.

Figure 9:
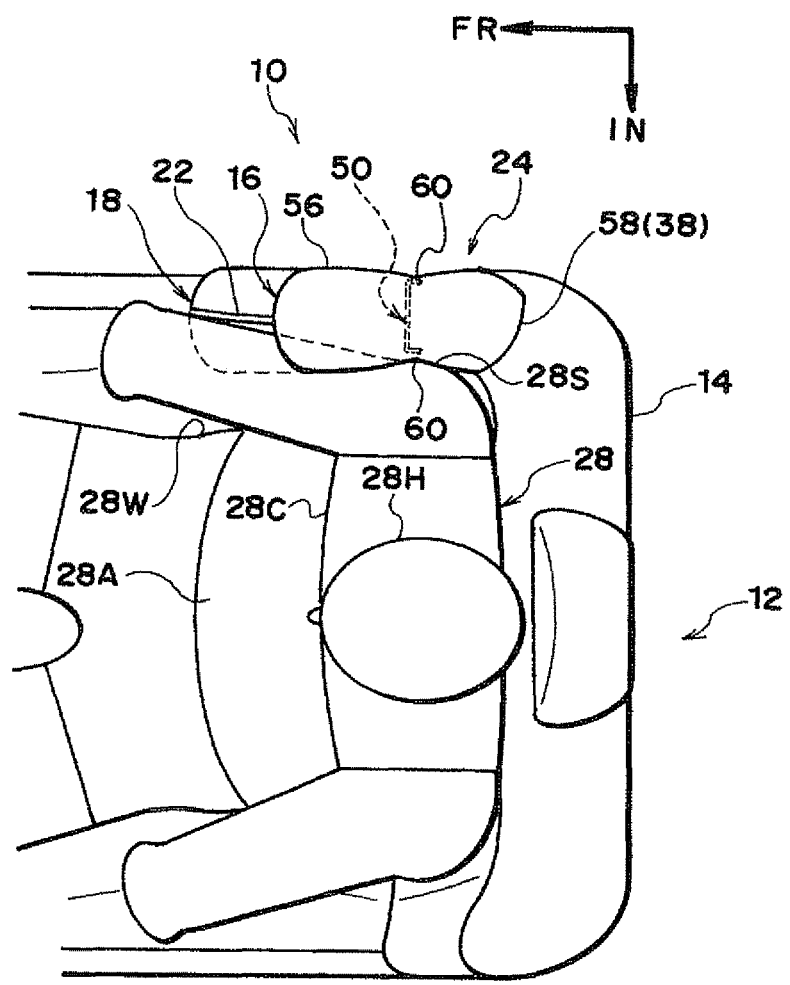

Note that, although a state in which the shoulder portion 28S is restrained at the valley portion 60 of the upper bag portion 16 is illustrated in FIG. 9, the head portion 28H as well can similarly be restrained at the valley portion 60 of the upper bag portion 16.

MODIFIED EXAMPLE 3

Figure 10:
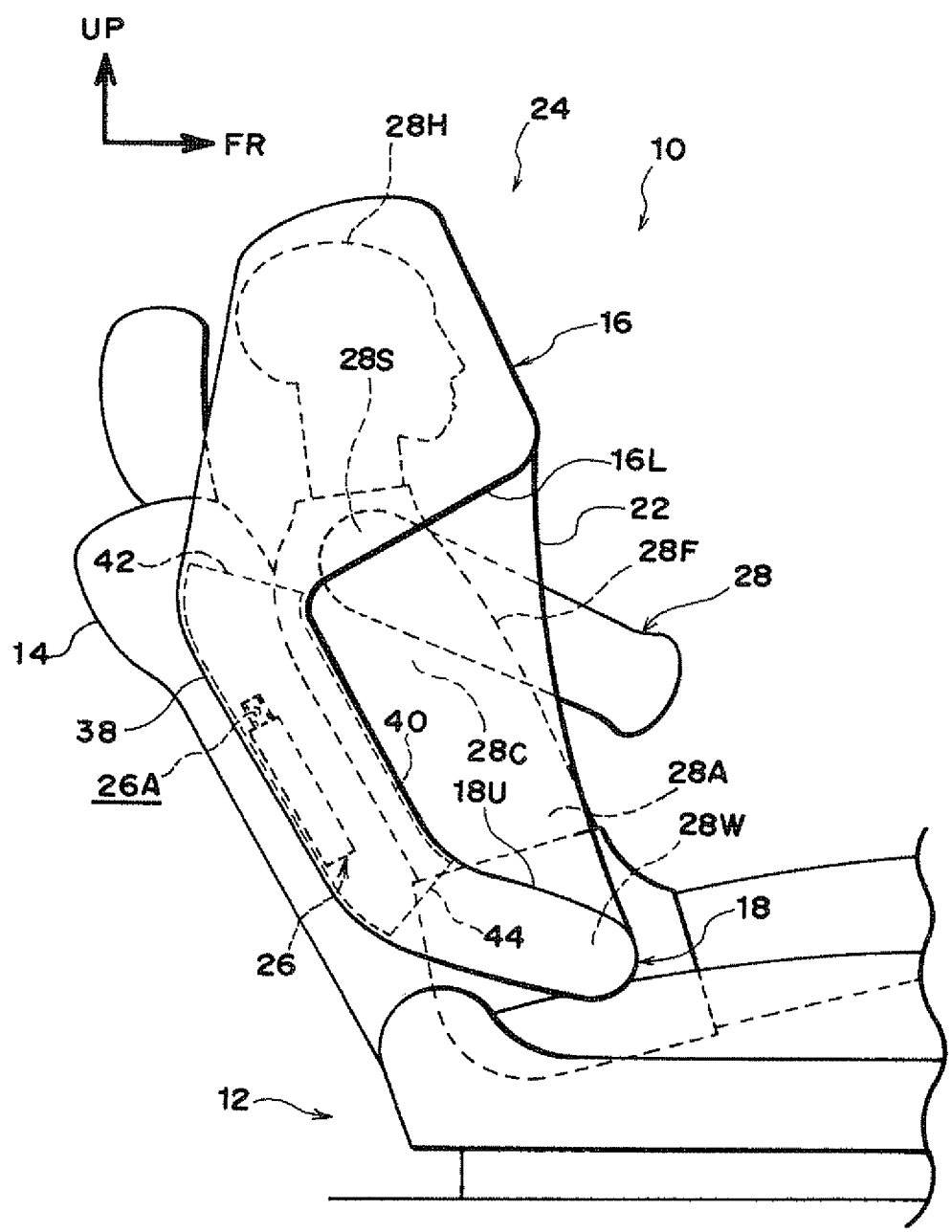
FIG. 10 is a side view showing a state in which the side airbag relating to modified example 3 is inflated and deployed at the side of the passenger.

The intermediate portion 22 can also be made to be the structure of modified example 3 shown in FIG. 10. In this modified example 3, the front edge of the intermediate portion 22 is formed so as to connect the front end of the lower edge portion 16L of the upper bag portion 16 and the front end of the upper edge portion 18U of the lower bag portion 18. In other words, the region of the intermediate portion 22 is deployed toward the vehicle front side to a region that corresponds to a front portion 28F of the chest portion 28C of the passenger 28.

By deploying the region of the intermediate portion 22 toward the vehicle front side in this way, at the time of a side collision, the front portion 28F, at which the strength is relatively great among the chest portion 28C of the passenger 28, can be stably restrained by the intermediate portion 22. Further, the abdomen portion 28A of the passenger 28 also can be restrained by the intermediate portion 22.

MODIFIED EXAMPLE 4

Figure 11:
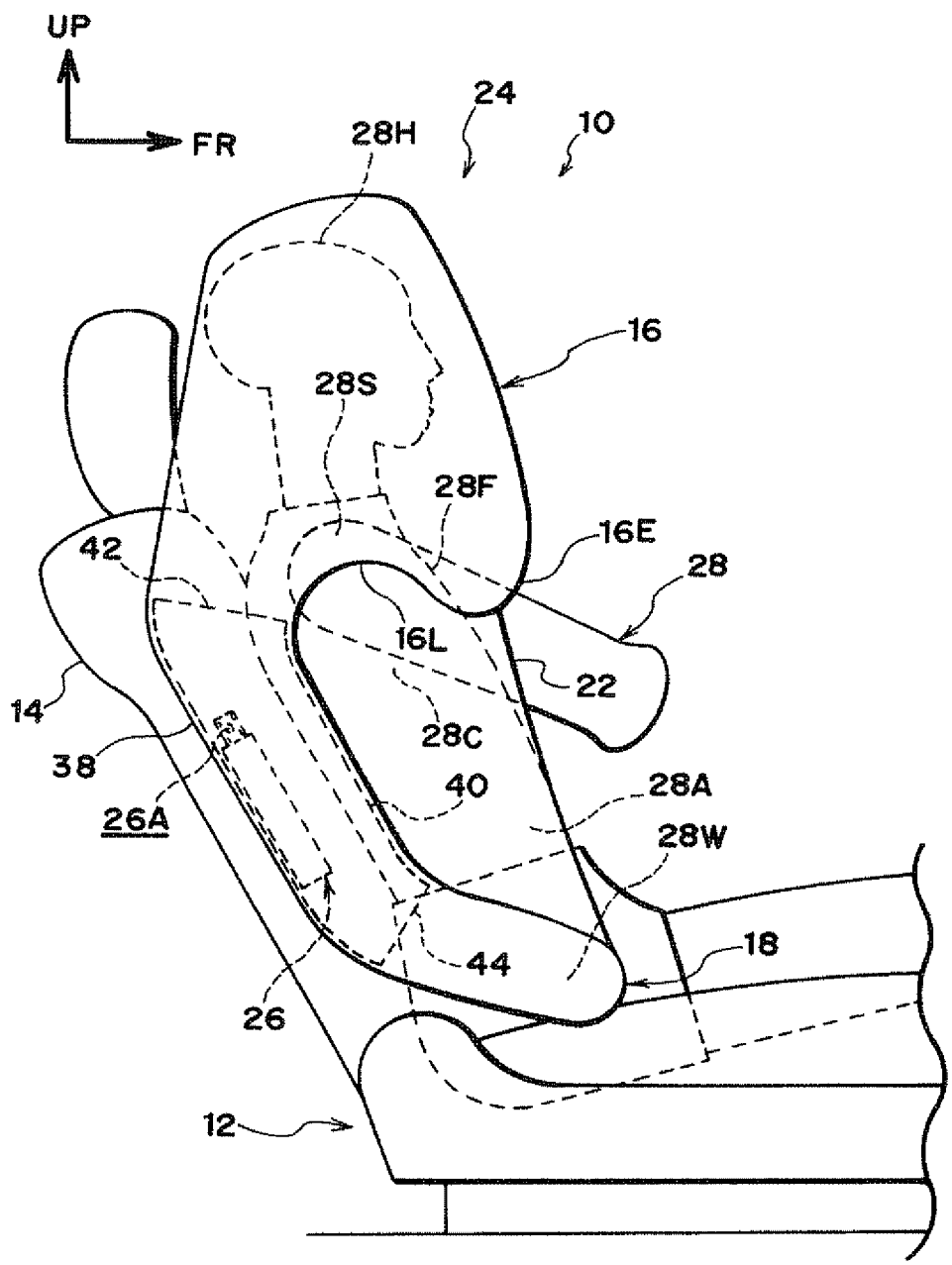
FIG. 11 is a side view showing a state in which the side airbag relating to modified example 4 is inflated and deployed at the side of the passenger.

The intermediate portion 22 can also be made to be the structure of modified example 4 shown in FIG. 11. In this modified example 4, an extended bag portion 16E, that extends to the region corresponding to the front portion 28F of the chest portion 28C of the passenger 28, is provided at the vehicle front side lower end edge of the upper bag portion 16. Further, the intermediate portion 22 also is deployed toward the vehicle front side, in the same way as modified example 3.

Due thereto, at the time of a side collision, the front portion 28F, at which the strength is relatively great among the chest portion 28C of the passenger 28, can be restrained by this extended bag portion 16E. Therefore, the load, that is inputted to the passenger 28 when the passenger 28 is restrained by the side airbag 24, can be dispersed. Further, due thereto, input of load to a region, at which the strength is relatively small, of the passenger 28 can be suppressed.

MODIFIED EXAMPLE 5

Figure 12:
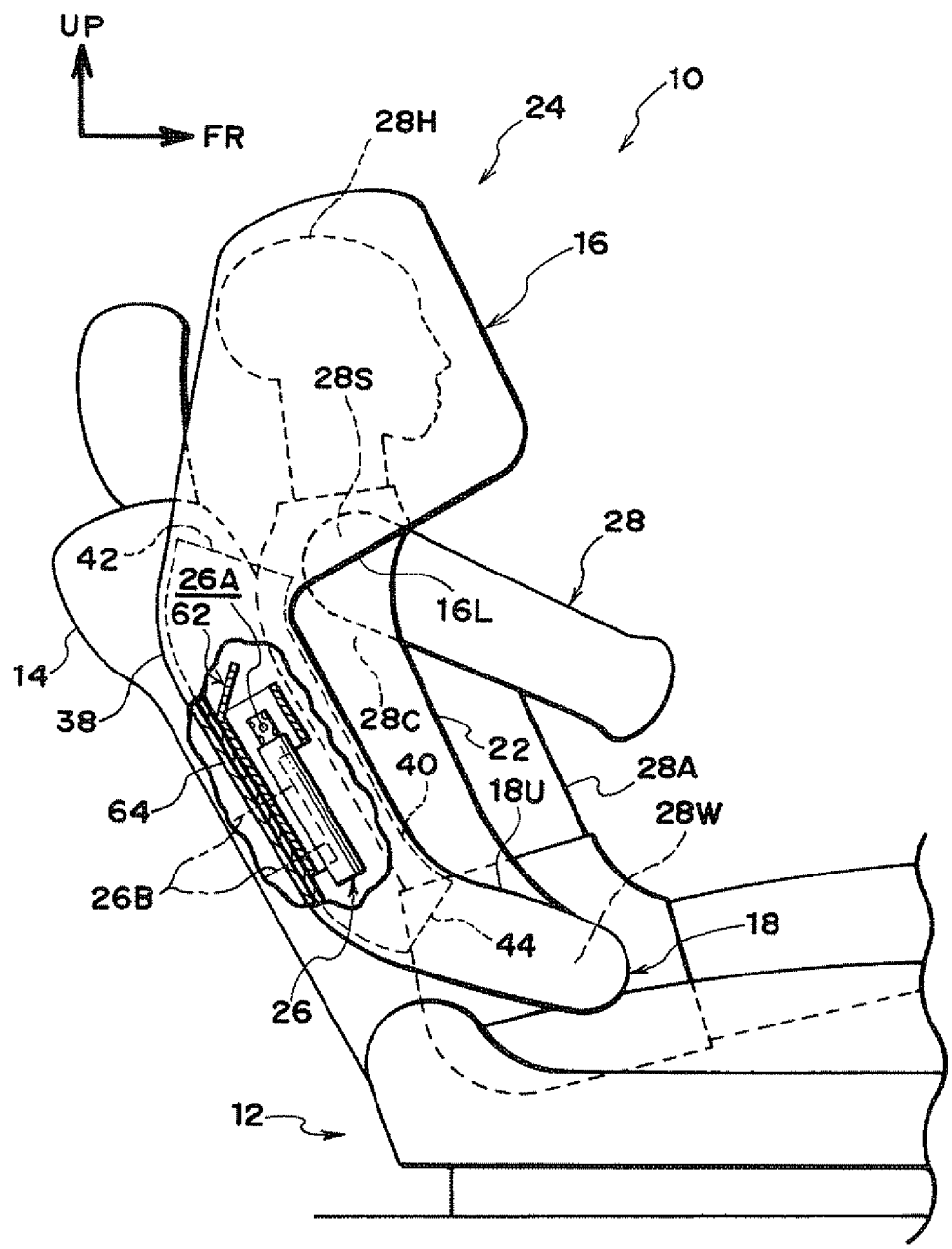
FIG. 12 through FIG. 14 relate to modified example 5.

As in modified example 5 that is shown in FIG. 12, a diffuser 62, which directs the flow of gas that is ejected from the gas ejection holes 26A toward the upper bag portion 16 side and the lower bag portion 18 side, may be provided at the inflator 26. This diffuser 62 is, together with the inflator 26 for example, fixed to a seat back frame 64 that is the skeleton of the seat back 14.

For example, two stud bolts 26B are provided at the inflator 26 so as to stand in a direction orthogonal to the axial direction of the inflator 26. These stud bolts 26B pass-through a lower portion 62B of the diffuser 62 and project-out. Due to the stud bolts 26B being passed-through the seat back frame 64 and being fastened by nuts (not illustrated), the inflator 26 and the diffuser 62 are fastened and fixed to the seat back frame 64.

Figure 13:
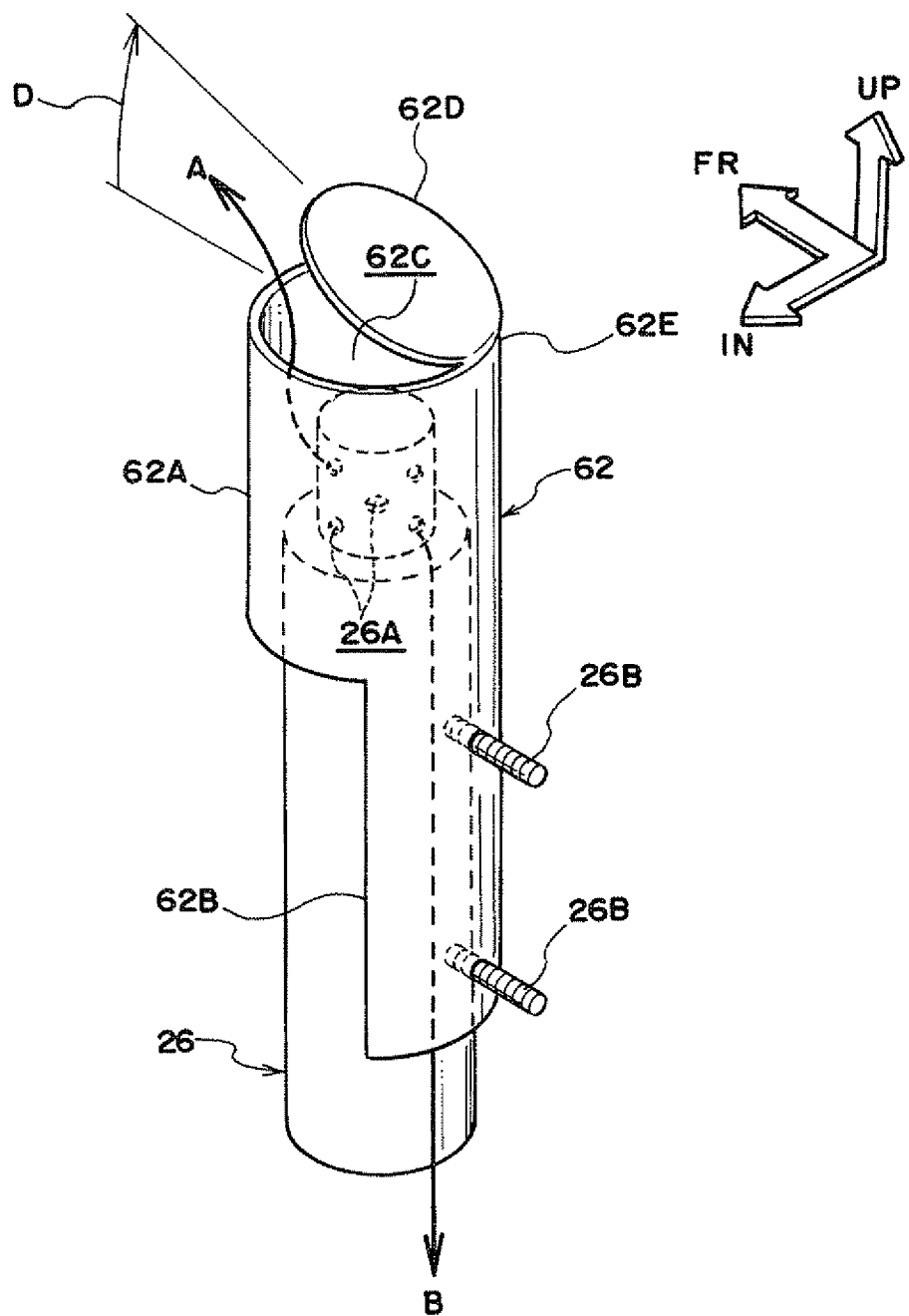

As shown in FIG. 13, the diffuser 62 is configured to have an upper portion 62A that is cylindrical-tube-shaped and that has a larger diameter than the inflator 26, the lower portion 62B that is connected with the lower side of the rear portion of the upper portion 62A, and a top wall portion 62D that is joined to the rear portion of the top end of the upper portion 62A.

Generally, when the inflator 26 operates, gas is ejected in a radial form in the radial direction of the inflator 26 from the gas ejection holes 26A. However, due to this gas being received at the upper portion 62A that is cylindrical-tube-shaped, the flow of gas can be restricted to the axial direction of the inflator 26. This gas flows in an arrow A direction toward the upper bag portion 16 (FIG. 12), and flows in an arrow 13 direction toward the lower bag portion 18 (FIG. 12). The lower portion 62B of the diffuser 62 is configured with a portion of a cylindrical tube, that has the same curvature as the upper portion 62A for example, being a curved portion that extends toward the axial direction lower side of the inflator 26, and, in addition to performing as a fixing portion to the seat back frame 64 (FIG. 12), also performs as a guide plate that guides gas in the arrow B direction.

The top wall portion 62D is configured so as to open slightly toward the vehicle upper side due to a joined portion 62E with the upper portion 62A deforming due to the pressure of the gas that is ejected from the gas ejection holes 26A of the inflator 26. Due to the top wall portion 62D opening, an opening portion 62C is formed at the upper end of the upper portion 62A, and gas flows in the arrow A direction from the opening portion 62C toward the upper bag portion 16 side (see FIG. 12).

To describe further, the flowing direction of the gas can be controlled by an opening angle D of the top wall portion 62D at this time. If the opening angle D of the top wall portion 62D is set to be large, the flow of gas can be directed toward the vehicle upper side. Further, if the opening angle D of the top wall portion 62D is set to be small, the flow of gas can be directed toward the vehicle front side. Accordingly, the way that the upper bag portion 16 inflates and deploys, that is what region of the upper bag portion 16 is to be inflated preferentially, can also be controlled by the settings of the diffuser 62.

Figure 14:
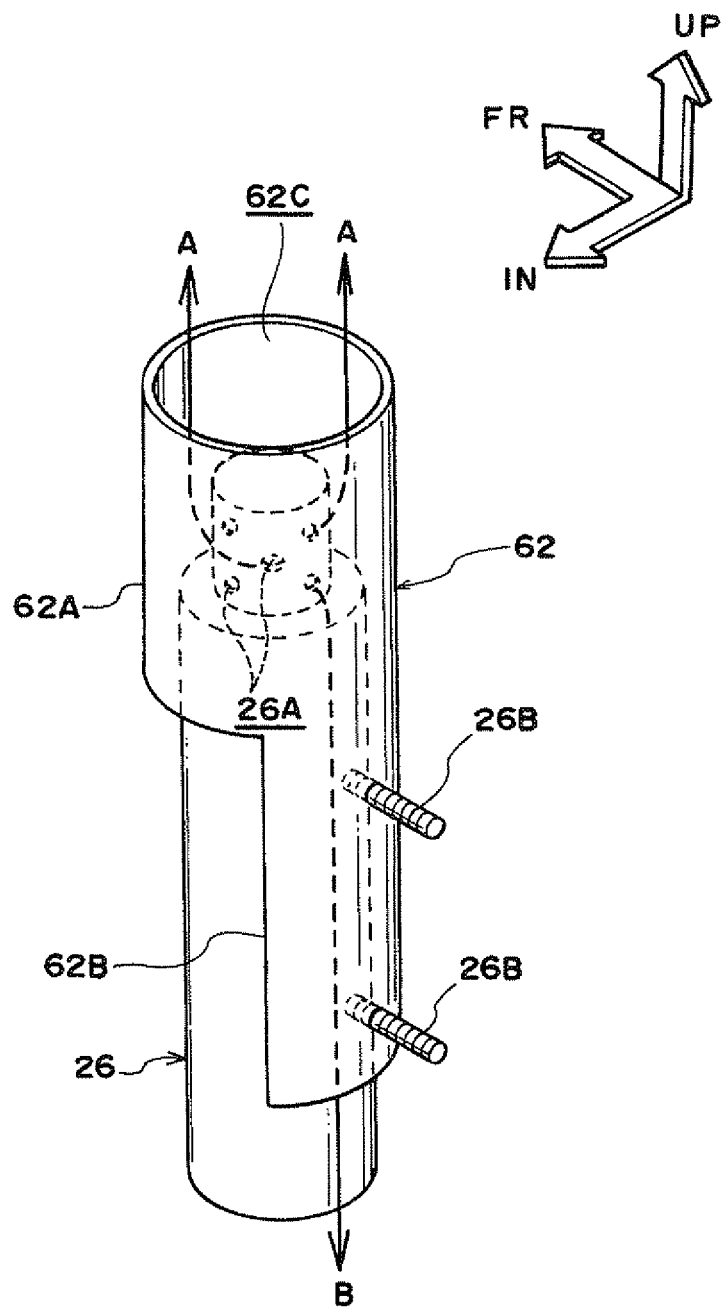

The structure of the diffuser 62 is not limited to this, and for example, may be a structure in which the top wall portion 62D is not provided as shown in FIG. 14.

In this way, in the side airbag device 10 for a vehicle relating to modified example 5, the flow of the gas that is ejected from the gas ejection holes 26A of the inflator 26 can be directed toward the upper bag portion 16 side and the lower bag portion 18 side by the diffuser 62 that is provided at the inflator 26. Therefore, the upper bag portion 16 and the lower bag portion 18 can respectively be inflated and deployed appropriately by using the general-purpose inflator 26 that has the gas ejection holes 26A at one end thereof.

Although the illustrated example describes that the side airbag device 10 for a vehicle is provided at the side portion of the seat back 14, the side airbag device 10 for a vehicle is not limited to this, and may be provided at the inner side of the door trim 31 at the side door 30. Further, although the side door 30 is presented as the vehicle body side portion, the vehicle body side portion is not limited to this, may be a region of the vehicle body that is positioned at the side of the passenger, and also includes a non-door portion.

(Description of the Reference Numerals)
10 side airbag device for a vehicle
12 vehicle seat
14 seat back
16 upper bag portion
16E extended bag portion
16L lower edge portion
18 lower bag portion
18U upper edge portion
22 intermediate portion
24 side airbag
26 inflator
26A gas ejection hole
28 passenger
28C chest portion
28F front portion
28H head portion
28S shoulder portion
28W waist portion
30 side door (vehicle body side portion)
36 vent hole
38 tubular inflated portion
42 end portion at vehicle upper side
44 end portion at vehicle lower side
46 lower check valve
48 upper check valve
62 diffuser

The invention claimed is:

1. A side airbag device for a vehicle comprising:
a side airbag comprising:
an upper bag portion that is positioned at a vehicle upper side, and corresponds to a head portion to a shoulder portion of a passenger seated in a vehicle seat;
a lower bag portion that is positioned at a vehicle lower side of the upper bag portion, and corresponds to a waist portion of the passenger; and
an intermediate portion that is a film-shaped non-inflating portion, and connects a lower edge portion of the upper bag portion and an upper edge portion of the lower bag portion, corresponds to a chest portion of the passenger, wherein:
at a time of a side collision, the side airbag receives a supply of gas for inflation and inflates and deploys between the passenger and a vehicle body side portion,
the side airbag device for a vehicle is configured such that a load, that is imparted toward a vehicle transverse direction inner side from the upper bag portion to the shoulder portion when the shoulder portion is restrained by the upper bag portion, decreases at a latter stage of restraint of the shoulder portion,
a tubular inflated portion is further provided that communicates with a vehicle rear side of the upper bag portion at an end portion at a vehicle upper side, and communicates with a vehicle rear side of the lower bag portion at an end portion at a vehicle lower side, and inflates, before the upper bag portion and the lower bag portion, along a spine direction of the passenger at an initial stage of inflation and deployment of the side airbag, a reinforcing cloth that is tubular and is sewn to the inner surface of the tubular inflated portion, and
the lower bag portion that is configured so as to inflate in a tubular shape toward a vehicle front side and downwardly at an incline, from an end portion at the vehicle lower side of the tubular inflated portion.

2. The side airbag device for a vehicle of claim 1, wherein
a tubular inflator, at which gas ejection holes are disposed at a vehicle upper side, is provided within the tubular inflated portion; and
a diffuser which directs a flow of gas that is ejected from the gas ejection holes toward the upper bag portion side and the lower bag portion side, is provided at the inflator.

3. The side airbag device for a vehicle of claim 1, wherein
an inflated thickness of the upper bag portion when the side airbag inflates and deploys is set to be thicker than an inflated thickness of the lower bag portion,
an internal pressure of the lower bag portion is set to be higher than an internal pressure of the upper bag portion; and
the lower bag portion is configured such that inflation and deployment thereof are completed before that of the upper bag portion.

4. The side airbag device for a vehicle of claim 3, wherein a lower check valve, which permits passage of gas toward the lower bag portion side and restricts passage of gas in a direction opposite thereto, is provided at the end portion at the vehicle lower side of the tubular inflated portion.

5. The side airbag device for a vehicle of claim 4, wherein an upper check valve, which permits passage of gas toward the upper bag portion side and restricts passage of gas in a direction opposite thereto, is provided at the end portion at the vehicle upper side of the tubular inflated portion.

6. The side airbag device for a vehicle of claim 5, wherein flow path opening surface areas and flow path lengths of the lower check valve and the upper check valve are configured such that gas that is supplied into the tubular inflated portion is distributed in accordance with respective volumes and internal pressure settings of the upper bag portion and the lower bag portion.

7. The side airbag device for a vehicle of claim 1, wherein an extended bag portion, that extends to a region corresponding to a front portion of the chest portion of the passenger, is provided at a vehicle front side lower end edge of the upper bag portion.

8. The side airbag device for a vehicle of claim 2, wherein an inflated thickness of the upper bag portion when the side airbag inflates and deploys is set to be thicker than an inflated thickness of the lower bag portion,
an internal pressure of the lower bag portion is set to be higher than an internal pressure of the upper bag portion; and
the lower bag portion is configured such that inflation and deployment thereof are completed before that of the upper bag portion.

9. The side airbag device for a vehicle of claim 2, wherein an extended bag portion, that extends to a region corresponding to a front portion of the chest portion of the passenger, is provided at a vehicle front side lower end edge of the upper bag portion.

10. The side airbag device for a vehicle of claim 3, wherein an extended bag portion, that extends to a region corresponding to a front portion of the chest portion of the passenger, is provided at a vehicle front side lower end edge of the upper bag portion.

11. The side airbag device for a vehicle of claim 4, wherein an extended bag portion, that extends to a region corresponding to a front portion of the chest portion of the passenger, is provided at a vehicle front side lower end edge of the upper bag portion.

12. The side airbag device for a vehicle of claim 5, wherein an extended bag portion, that extends to a region corresponding to a front portion of the chest portion of the passenger, is provided at a vehicle front side lower end edge of the upper bag portion.

13. The side airbag device for a vehicle of claim 6, wherein an extended bag portion, that extends to a region corresponding to a front portion of the chest portion of the passenger, is provided at a vehicle front side lower end edge of the upper bag portion.

14. The side airbag device for a vehicle of claim 8, wherein an extended bag portion, that extends to a region corresponding to a front portion of the chest portion of the passenger, is provided at a vehicle front side lower end edge of the upper bag portion.

* * * * *